3,248,343
HYDROCARBON CONVERSION CATALYST
Joe T. Kelly, Littleton, Colo., William Schoen, Houston, Tex., and Clifton N. Sechrist, Hazlecrest, Ill., assignors to Standard Oil Company, Chicago, Ill., a corporation of Indiana
No Drawing. Filed Apr. 7, 1964, Ser. No. 358,110
15 Claims. (Cl. 252—442)

This application is a continuation-in-part of our copending application, S.N. 45,288, filed July 26, 1960, now abandoned, which application is incorporated herein by reference and made a part hereof.

This invention relates to catalysts consisting essentially of an aluminum halide positioned on surface-hydroxyl-containing adsorbent solid, and to processes for preparing and using such catalysts.

The solid aluminum halides, particularly aluminum chloride, have been used as catalysts for many conversion reactions. The aluminum halid catalysts are utilized in the petroleum industry for alkylation reactions and paraffin isomerization reactions. The aluminum halides may be used as such—often spoken of as bulk catalyst usage. Or the viscous liquid complex formed by the aluminum halide and a hydrocarbon or other organic compound is utilized as the catalyst. More convenient catalysts consist essentially of aluminum halide adsorbed on an adsorbent material support such as charcoal, bauxite, and activated alumina. Catalysts consisting essentially of aluminum chloride adsorbed on activated bauxite have been used commercially for the isomerization of normal butane to isobutane in the vapor phase.

The preparation of catalysts consisting essentially of a solid aluminum halide, such as aluminum chloride and an adsorbent material, has been accomplished in several ways. The most commonly used at this time is a so-called sublimation procedure. In this procedure, aluminum chloride is vaporized and the vapor passed into contact with a mass of adsorbent material, which may be held at temperatures of about the temperature of aluminum chloride vapor; in another form of this procedure, the aluminum chloride vapors are admixed with a carrier which is generally the hydrocarbon, in the vapor state, to be treated with a catalyst.

In another preparation procedure, molten aluminum chloride is intermingled with the adsorbent material. Excess aluminum chloride is then removed by heating the "catalyst" to about the sublimation temperature of aluminum chloride.

When a liquid phase conversion operation is being used, the aluminum chloride may be positioned on the adsorbent material by passing a saturated solution of aluminum chloride and hydrocarbon through the adsorbent material until the desired amount of aluminum chloride has been adsorbed onto the material. The hydrocarbon in this situation may be that treated or another hydrocarbon which possesses a useful degree of solubility for aluminum chloride.

The preparation of the "solid catalyst" by adsorption of aluminum chloride either from a vapor or a liquid solution is very prolonged at best. With either procedure, it is difficult to obtain a uniform distribution of aluminum chloride throughout the mass of adsorbent material. Particularly with the sublimation procedure it is difficult to obtain a catalyst containing large amounts of aluminum chloride in any contacting time. In the liquid adsorption procedure, it is difficult to prepare a catalyst containing large amounts of aluminum chloride in an acceptable time for commercial operations. All of these difficulties are accentuated with increasing size of the mass of adsorbent material to be provided with the aluminum chloride.

We have discovered new improved catalysts, useful for hydrocarbon conversion reactions, which have many advantages over catalysts previously available. Our catalysts, broadly considered, are aluminum halide positioned on surface-hydroxyl-containing adsorbent solid and associated with hydrogen halide. It is preferred that the hydrogen halide correspond to the particular aluminum halide used. Aluminum trichloride ($AlCl_3$) is a preferred aluminum halide and will be used in the subsequent discussion for the purpose of illustration. More specifically, the preferred catalysts consist essentially of the reaction product of aluminum chloride with surface hydroxyl groups of surface-hydroxyl-containing adsorbent solid associated with hydrogen chloride. The catalysts are most useful for hydrocarbon conversion reactions carried out at temperatures below about 200° F., because the catalysts are relatively unstable at higher temperature due to dissociation of the associated HCl component.

The term "surface-hydroxyl-containing adsorbent solid" includes the various forms of silica gel and the various alumina materials, natural and synthetic, which have a substantial portion of the surface existing in the hydroxyl form, as opposed to the "dehydrated" oxide form. No adsorbed water, as such, should be present. Aluminas which can be treated to produce the required surface hydroxyl groups are gamma, eta, and chi forms of alumina. The surface-hydroxyl-containing adsorbent solids are not significantly active for hydrocarbon isomerization, under the other conditions of the process, nor is the aluminum chloride reaction product alone significantly active; yet the reaction product, when conjoined with HCl, produces more hydrocarbon conversion than do the same amounts of aluminum chloride and HCl alone, or surface-hydroxyl-containing adsorbent solid either alone or with HCl, under the other conditions of the process. "Under the other conditions of the process" means all essential operational elements held the same, excluding the catalyst.

It has been discovered that aluminum chloride can exist on the surface of alumina in three forms: reacted with surface hydroxyl groups to form —O—$AlCl_2$ groups, chemisorbed $AlCl_3$ monomer, and as physically adsorbed aluminum chloride. In the case of silica gel, aluminum chloride can exist on the surface in only two forms; reacted with surface hydroxyl groups to form —O—$AlCl_2$ groups, and physically adsorbed monomer or dimer. The reacted and chemisorbed forms will associate HCl and thus form an active catalyst species; however, the chemisorbed monomer form is unstable and the $AlCl_3$ in this form tends to be desorbed by process and/or regeneration fluids, thus destroying this catalyst species. On the other hand, the reacted form is quite stable and, for example, the —O—$AlCl_2$ groups are not destroyed by atmospheric pressure inert gas purge at temperatures as high as 700° F., far above the sublimation temperature of $AlCl_3$. The physically adsorbed form is even more unstable than the chemisorbed monomer form and is not a practical catalyst component.

The surface-hydroxyl-containing adsorbent solid should have a substantial amount of surface area. It has been found that only those pores in the adsorbent solid having diameters greater than about 35 Angstrom units (35 A.) are utilized in forming the catalyst, therefore it is the surface area of the pores larger than about 35 A. which is important. The surface of adsorbent solid pores having diameters greater than about 35 A. is termed herein "effective surface" and the term "effective surface area" is used herein to mean the total surface area of an adsorbent solid minus the surface area attributable to surface within pores having diameters less than about 35 A. The surface areas and pore diameters herein are those which are determined by nitrogen adsorption techniques. It is desirable that the surface-hydroxyl-containing adsorbent solid have an effective surface area in the range of about 25–700 square meters per gram (sq. m./gm.), preferably 50–500 sq. m./gm.

The bauxitic materials which are naturally occurring impure alumina hydrates, such as bauxite and laterite, are a suitable source of surface-hydroxyl-containing adsorbent solids. These bauxitic materials may contain alumina monohydrates, for example, European bauxites, or they may contain alumina trihydrate, for example, North American, South American, and East Indian bauxites. Alumina is the predominant component; iron oxide is present—as much as 25 weight percent; silica as $SiO_2$ (or as an inorganic silicate, such as kaolinite) is present; titanium dioxide is usually another more or less major component; other materials in more or less minor amounts are present. The bauxites may be used as a source of surface-hydroxyl-containing adsorbent solid as produced in the mine, or they may be treated to reduce the iron oxide content or the silica content or the titanium dioxide content. It is important to minimize the alkali metal oxide content.

The aluminous materials which contain substantial amounts of oxides other than aluminum oxide may be suitable for use in preparing surface-hydroxyl-containing adsorbent to be conjoined with aluminum chloride and HCl. Materials which contain silicon dioxide, wherein the $SiO_2$ is present as such or in combination with the aluminum oxide—and water, along with aluminum oxide and hydrate water may be surface-hydroxyl-containing adsorbent solids. The synthetic material known as silica-alumina, which is used as a hydrocarbon cracking catalyst, is such a suitable aluminous material.

It is preferred to use alumina materials (synthetic or naturally occurring, such as bauxite) as the surface-hydroxyl-containing adsorbent solid for preparation of the catalyst. Any adsorbed molecular water should be removed from the solid prior to contacting it with aluminum halide, lest the effectiveness of some of the aluminum chloride to form a catalyst be destroyed by reaction or hydration with the water. Adsorbed water can be removed by drying or calcining the solid; however, if calcination is used it should not be carried out under conditions of temperature and time so severe as to destroy the surface hydroxyl groups.

A convenient method of ascertaining whether adsorbed water is absent and an effective amount of surface hydroxyl groups is present in a particular adsorbent solid to be used in preparing catalyst is to determine the weight loss of the defined solid upon heating to about 1832° F. This weight loss is termed "loss on ignition" (LOI). It has been found that satisfactory surface-hydroxyl-containing adsorbent solids are those which contain little or no adsorbed molecular water and which lose about 1–10 weight percent, preferably about 4–8 weight percent in the case of the aluminas and 1–6 weight percent in the case of silica gel, of their original weight upon being heated to about 1832° F. The weight loss in these ranges is due, almost entirely, to the destruction of surface hydroxyl groups with the consequent liberation of water. Weight loss greater than about 10 weight percent generally indicates the presence of adsorbed molecular water. Weight loss less than about 1 weight percent is an indication that insufficient hydroxyl groups are present on the surface to form an appreciably effective amount of the preferred catalyst species. The optimum weight loss in the case of silica gel is generally about 2 weight percent lower than the optimum for the aluminas.

The surface-hydroxyl-containing adsorbent solid for use in forming the catalyst must be prepared in a manner providing a substantial portion of the effective surface in the hydroxyl form so that there are available hydroxyl groups for reaction with aluminum chloride. It is preferred that at least about 50 percent of the effective surface be in the hydroxyl form. Optimally, nearly all of the effective surface is in the hydroxyl form with no molecular water present.

One method of producing a suitable surface-hydroxyl-containing adsorbent solid is to calcine a silica and/or alumina containing material to produce an adsorbent solid containing at least one of the following adsorbent solid forms: silica gel, chi alumina, eta alumina, gamma alumina, or mixtures thereof such as silica-alumina. An example of a suitable alumina-containing material is alumina trihydrate, such as beta-trihydrate. Suitable calcination conditions of time and temperature (e.g., a temperature in the range of about 300 to 1100° F. for a time in the range of about 1–24 hours) will produce an adsorbent solid having the required surface area and pore size properties and a LOI less than about 2–4 percent. Water is then added to the calcined adsorbent solid in the amount of about 1–5 weight percent or more. This water is conveniently added in the form of steam. The added water is permitted to react with the surface of the adsorbent solid to produce surface hydroxyl groups. This hydrated adsorbent solid is then dried under carefully controlled conditions so that molecular water is removed without destroying an appreciable number of the surface hydroxyl groups. Suitable drying conditions are a temperature in the range of about 200–300° F. for a time of about 10–100 hours. A dried inert gas purge may be used to hasten the drying process. Bauxite treated in this manner will produce the defined surface-hydroxyl-containing adsorbent solid. Of course, if the adsorbent solid, such as bauxite for example, as received contains 8–10 percent or more of water, as determined by loss on ignition, the hydration step may be omitted.

Another method of preparing the defined surface-hydroxyl-containing adsorbent solids having substantially complete surface hydroxyl coverage and containing little or no molecular water is to first calcine the solid under the calcination conditions described above to reduce the LOI to below about 4 percent. The calcined solid is then treated with anhydrous hydrogen chloride to produce essentially 100 percent hydroxyl coverage of the surface. The HCl treatment is carried out at a temperature in the range of about 50–150° F., and a pressure of 0–400 p.s.i.g. or higher for a time of at least about 0.1 hour. Preferred treating conditions are a temperature of about 70–120° F., 100–300 p.s.i.g., and a time of about 1–25 hours. After the HCl treatment excess HCl is removed from the adsorbent solid by evacuation, inert gas purge, or other convenient means. Bauxite can be treated in this manner also to produce a satisfactory surface-hydroxyl-containing adsorbent solid.

The catalyst is formed by contacting aluminum chloride with the defined surface-hydroxyl-containing adsorbent solid and causing the aluminum chloride to react with the surface hydroxyl groups on the surface of the defined adsorbent solid, thus forming —O—$AlCl_2$ groups on the surface. During this reaction one mole of HCl is liberated for each mole of $AlCl_3$ reacted. HCl is then caused to associate, mole for mole, with the —O—$AlCl_2$ groups to form the active catalyst. While it is in no way intended to limit the invention by the soundness or accuracy of any theories advanced herein to explain what the active catalyst species is, it is postulated that an —O—$AlCl_2$ site, when associated with HCl, forms a proton and a negatively charged species, (—O—$AlCl_3$)⁻, which constitutes the actual catalyst.

The aluminum chloride content corresponding to maximum catalyst activity is that amount of aluminum chloride required to provide a monolayer of reacted aluminum chloride molecules (i.e., reacted with hydroxyl groups to form —O—$AlCl_2$ groups) over the effective surface area of the defined adsorbent solid. The hydroxyl groups on the surface of a particular defined adsorbent solid having essentially 100% surface hydroxyl coverage are normally spaced closer together than are molecules of aluminum chloride in a monolayer. Therefore, not all of the hydroxyl groups on a solid having essentially complete hydroxyl coverage need be reacted to form a catalyst of maximum activity. It has been calculated that one gram of aluminum chloride will provide a monolayer of aluminum chloride molecules (or —O—$AlCl_2$ groups) over 534 square meters of effective surface area.

The preferred method of preparing the catalyst is to form a dry physical mixture of aluminum chloride and surface-hydroxyl-containing adsorbent solid and react the mixture at a temperature in the range of about 0–500° F., preferably about 200–350° F. Normally sufficient pressure is utilized to minimize sublimation of aluminum chloride from the reaction mixture to reduce aluminum chloride loss. A flowing stream of gas may be used as the heat transfer medium for heating the reaction mixture and cooling the reaction products. Hydrogen is a preferred gas, however other relatively unreactive gases such as nitrogen, helium, methane, ethane, propane, butane, etc., may also be used. The reaction time required decreases as the reaction temperature is increased. At the preferred reaction temperature of 200–350° F., a time of about 0.1 to 10 hours is normally sufficient to complete the reaction; however, longer reaction time is not detrimental. HCl is then caused to associate with the reaction product of aluminum chloride and surface-hydroxyl-containing adsorbent solid. This association must be done at a temperature below about 180–200° F. since it has been found that at higher temperature the association does not take place. In fact, a fully formed catalyst will liberate HCl if heated to a temperature of 180–200° F., or higher, even under pressures of 500 p.s.i. or more. The association with HCl is conveniently carried out by contacting the reaction product with anhydrous HCl at a pressure of about 10–500 p.s.i.a. and a temperature in the range of about 60–200° F. One mole of HCl associates for each mole of $AlCl_3$ which has reacted with the surface-hydroxyl-containing adsorbent solid. A time of about 1–100 hours is normally sufficient to complete the HCl association.

Any method of contacting aluminum chloride with the defined surface-hydroxyl-containing adsorbent solid and reacting the aluminum chloride with surface hydroxyl groups may be used. For example, a dry physical mixture of aluminum chloride and the defined adsorbent solid (dry-mix) may be contacted, under suitable temperature conditions as described above, with an inert liquid to cause the reaction to take place. This preparation technique is particularly suitable for preparation of catalyst to be used in a fixed-bed operation, such as isomerization of butane, pentane, hexane, or mixtures thereof. In this case it is particularly convenient to form the dry-mix within the reaction vessel and circulate the inert liquid through the bed until the aluminum chloride reaction with the hydroxyl groups is essentially complete.

The inert liquide used in the catalyst preparation must be one which does not form addition compounds, complexes, or the like, with aluminum halide or on the adsorbent material. To illustrate, certain ethers form stable complexes with aluminum chloride; aromatic hydrocarbons form complexes which possess no significant catalyst activity in conjunction with the adsorbent material; olefinic hydrocarbons form complexes which possess little catalyst activity in conjunction with the adsorbent material. Halogenated hydrocarbons, such as methylene chloride and ethylene dichloride, are suitable liquids. The preferred inert liquids are saturated hydrocarbons which are liquid at the conditions of catalyst preparation. These liquid saturated hydrocarbons may be straight chain, branched chain, or cyclic in configuration. The normally liquid alkanes and cycloalkanes, such as butane, pentane, hexane, heptane, octane cyclopentane, cyclohexane, methylcyclohexane, etc., and mixtures thereof are particularly suitable inert liquids.

Another convenient method of contacting the aluminum chloride with the surface-hydroxyl-containing adsorbent solid is to sublime aluminum chloride onto the surface of the solid; however, when sublimation is used, care must be taken not to carry out the sublimation under conditions which will destroy surface hydroxyl groups before they can be reacted with the aluminum chloride. Thus, it is preferred to use a carrier gas, for example hydrogen, nitrogen, and/or lower molecular weight paraffin hydrocarbons, to assist in subliming the aluminum chloride and to carry the aluminum chloride onto the adsorben solid. Reaction of alumum chloride with surface hydroxyl groups occurs during the sublimation procedure. After the desired amount of aluminum chloride has been added to the adsorbent the reaction may be completed. Completion of the reaction may be determined by checking one cessation of HCl liberation.

The most desirable ratio of $AlCl_3$ to the defined adsorbent solid depends upon the effective surface content of the particular adsorbent solid used. For example, with surface-hydroxyl-containing adsorbent solid particles (gamma alumina, eta alumina, chi alumina, silical gel, or mitxures thereof) of about 20–60 mesh size and having an effective surface area of about 230 sq. m./gm., the proportions will normally be about 25–35 weight percent $AlCl_3$ and about 65–75 weight percent adsorbent solid. Most catalyst-forming reaction mixtures comprise 10–50 weight percent $AlCl_3$ and 50–90 weight percent of the defined adsorbent solid.

The catalyst is extremely versatile because it can be prepared in a great number of particle sizes. The final catalyst configuration is determined by the configuration of the surface-hydroxyl-containing adsorbent solid used. The defined adsorbent solid may be in the form of extremely fine particles, for example, talc-like character. A range of particle sizes may be used, particularly for slurry contacting of catalyst and liquid hydrocarbons; in such an operation, the range of particle sizes may be from about 60 mesh to 300 mesh screen size. Larger size granules or grains are conveniently used to produce catalyst suitable for fixed bed operation, such as screen mesh size of 20–60 or mesh size of 4–8. Even larger sizes may be used where mass flow into and out of the pore structure is not a hindrance to effective operations. The defined adsorbent solid may be formed into regular shapes, such as pills of various thickness and diameter, for example, ⅛" by ¹⁄₁₆" or ¼" by ⅛"; or into spheres or extrudates of various sizes.

The catalyst prepared from aluminum chloride and the surface-hydroxyl-containing adsorbent solids described hereinabove does not differ in visual appearance from the adsorbent solid itself, i.e., the aluminum halide is not evident to visual examination. The catalyst flows as freely as the arsorbent solid itself. The catalyst is hydroscopic, therefore care should be taken to avoid contacting the catalyst with moisture.

The activity of the catalyst may, in some cases, be improved by treatment of the defined adsorbent solid prior to formation of the catalyst. For example, the defined adsorbent solid is in many instances improved in respect to final catalyst activity by treatment with an acid, such as hydrochloric acid, phosphoric acid, sulfuric acid, nitric acid, and acetic acid. Aluminas in particular show significant improvement in the activity of the formed catalyst after such acid treatment which probably serves to improve pore size distribution.

As had been pointed out above, one mol of HCl is liberated for each mol of $AlCl_3$ reacted with surface hydroxyl groups. It has also been pointed out that the reaction product (the adsorbent solid —O—$AlCl_3$) alone, i.e., without associated HCl, is not an active hydrocarbon conversion catalyst. It is possible to employ a catalyst preparation technique which will result in association of the liberated HCl with the —O—AlCl₃ groups to form active catalyst, without the addition of extraneous HCl. Batch reaction of AlCl₃ with surface-hydroxyl-containing adsorbent solid in an autoclave, in which liberated HCl is retained, is an example of such a technique. However, this is generally difficult and time consuming to accomplish. The difficulty and extended time required can be understood by realizing that each mol of HCl which is liberated during the reaction must in turn be associated with the reaction product in order to maximize catalyst yield. While we have prepared satisfactory catalysts in this manner, we prefer to react the aluminum chloride with surface hydroxyl groups at temperatures above about 200° F. in a flow system in order to achieve higher reaction and heat transfer rates. We then prefer to conduct the HCl association as a separate step employing excess HCl, in order to reduce the time required to achieve essentially complete HCl association. Of course, not all of the aluminum chloride-hydroxyl group reaction product need be associated with HCl in order to obtain effective catalyst mass, since the unassociated —O—AlCl₂ groups are merely inert. It is clear however that maximum effectiveness of the catalyst mass produced is achieved when all of the reaction product is associated with HCl.

*Example 1*

The isomerization of a natural mixture of hexanes containing less than 0.5 percent benzene obtained from a catalytic reformate was studied in a fixed bed unit. The reactor section was 16 feet tall and 2 inches in diameter. The reactor was designed to permit sampling in each quarter section, i.e., bottom, second, third, and top. Flow within the catalyst bed was up-flow.

The ability to prepare a catalyst by passing an aluminum trichloride saturated solution in cyclohexane through a bed of adsorbent solid was tested on three occasions. The adsorbent material in each test was a bauxite which had been calcined at 900° F. prior to introduction into the reactor. This bauxite had a mesh size range of 8–14. The bauxite was added to the reactor and dried again at 275–300° F. with a flowing stream of nitrogen. Technical grade cyclohexane was circulated through a vessel containing solid technical grade aluminum trichloride. The cyclohexane-aluminum trichloride solution was then circulated up-flow through the bauxite and back through the aluminum trichloride saturator. At the end of the circulation period, the cyclohexane was drained and the catalyst sampled in each quarter length.

Tests 1, 2, and 3 show the effect of cyclohexane circulation time on the amount of aluminum trichloride adsorbed by the bauxite and also the change in distribution of the aluminum trichloride with time.

| Test No. | 1 | 2 | 3 |
|---|---|---|---|
| Cyclohexane circulated, hrs., Up-flow | 7 | 61 | 78 |
| AlCl₃ Saturator, ° F | 187 | 199 | 160 |
| Reactor, ° F | 194 | 198 | 160 |
| Wt. percent AlCl₃ Content in Reactor Zone, Qtrs.: | | | |
| Top | 5 | 11 | 17 |
| Third | 6 | 11 | 17 |
| Second | 8 | 15 | 17 |
| Bottom | 10 | 15 | 17 |

Hexane isomerization was carried out with a reactor temperature of about 125° F. using a weight hourly space velocity of 0.10. The feed contained about 0.44 weight percent of hydrogen chloride promoter in Test No. 1 and about 0.95 weight percent of HCl in Tests 2 and 3. After 21 hours of operation, the total dimethyl butane (DMB) content of the hexane product was: Test No. 1, 24%; Test No. 2, 31%; Test No. 3, 46%.

*Example 2*

In this illustration, granular aluminum chloride and bauxite of the type used in Tests 1–3 of Example No. 1 were thoroughly mixed and the mixture introduced into the reactor. In this example, however, the bauxite was first acid washed with a 5 wt. percent hydrochloric acid solution and then calcined at 850–900° F. for 16 hrs. prior to mixing it with aluminum chloride. The relative amounts of, the two materials were aluminum trichloride, 20 weight percent, and bauxite, 80 weight percent. The reactor was then filled with cyclohexane and brought to a temperature of about 187° F. The reactor was closed and the dry-mix allowed to soak in the cyclohexane at this temperature for 24 hours. Then the cyclohexane was drained and the reactor purged with dry-nitrogen. Samples of catalyst showed that the average aluminum trichloride content of the particular solid was 14%. The indivirdual zones showed aluminum chloride contents: bottom, 12%; second, 13%; third, 17%; and top, 14%.

A hexane isomerization run was then carried out utilizing the same feed as in Example 1 with approximately 2 weight percent of hydrogen chloride promoter in the feed; a weight hourly space velocity of 0.1 and a reactor temperature of 112° F. At hour 24 the hexane product contained 40% of dimethyl butanes.

Comparison of the results of Tests 1–3 of Example 1 and Example 2 indicate that there is a great saving in time in the use of the soak operation with the dry-mix to contact and react the aluminum chloride with surface-hydroxyl-containing adsorbent solid, this case bauxite. The difference between the operating conditions with respect to temperature is overcome by the activity increase due to the increased HCl association obtained in Example 2 due to the higher HCl content of the feed. This is shown by the higher DMB content produced in Example No. 2 as compared with Test No. 2 of similar aluminum trichloride content.

*Example 3*

In this illustration, the adsorbent material was alumina of 20–60 mesh size range. The alumina was acid washed with hydrochloric acid prior to being calcined. The alumina and powdered technical grade aluminum trichloride were thoroughly mixed and added to the reactor. The mixture contained 80 weight percent of this activated alumina and 20 weight percent of the aluminum trichloride.

Hexane feed was introduced into the dry-mix in the reactor at a temperature at 95° F., a weight hourly space velocity of 0.1, and containing 4.5 weight percent of HCl. The amount of DMB in the hexane product increased very rapidly and at hour 20 was at 60%. This run was continued to observe catalyst activity decline rate. The activity decline rate here was less than that of the catalyst prepared in Example 2 and much superior to the catalysts prepared in Tests 1–3 of Example 1.

Comparison of the Examples 2 and 3 shows that there is no need to preform the catalyst in the reactor even using dry-mix procedure. Superior results can be obtained by forming the catalyst in place from a dry-mix by simple start-up operation of the process, provided there is sufficient HCl in the feed to complete the HCl association step in reasonable time.

*Examples 4 and 5*

In these examples, isomerization of the hexane feed described above was carried out on small scale continuous flow units provided with a reactor 3' tall and 1" internal diameter. In each example, the adsorbent material was 20–60 mesh activated alumina which had not been acid washed prior to calcination. The isomerization in each case was carried out at 80° F. at an equivalent weight hourly space velocity of 0.1 and approximately 3 weight percent of HCl promoter present in the feed.

The catalyst utilized in Example 4 was prepared by adding to a large flask the activated alumina and powdered aluminum trichloride in a weight relationship: alumina, 80%, and aluminum trichloride, 20%. Cyclohexane was added to the flask. The flask was then maintained at reflux temperature of about 80° C. for about 16 hours at which time, by appearances, all of the aluminum trichloride had been positioned on the alumina. The catalyst was recovered from the cyclohexane and charged to the reactor for the isomerization run.

In Example 5, 80:20 weight ratio of alumina-aluminum trichloride dry-mix was charged to the reactor. Hexane feed was introduced and the isomerization run begun.

The conversion in each example was about 16% of DMB after one day of operation, but after two days total time on hexane feed the conversions were both approximately 64% of DMB in the hexane product. It is to be understood that the time relations set out in Examples 4 and 5 are not comparable to the time relations set out in Tests 1–3 of Example 1 and Examples 2 and 3. The results of Examples 4 and 5 are in 24 hour intermittent continuous flow runs. However, numerous runs carried out in this fashion and compared with continuous flow runs show that differences in catalyst activity can be accurately determined by these "intermittent-continuous" flow runs.

The flow runs were continued to 16 days at a temperature of 80° F. throughout the period, the catalyst of Example 5 showed somewhat better activity than did the catalyst of Example 4, ignoring the first days of operation. The activity decline rate in Example 5 was less than that in Example 4. At day 16 the DMB content for Example 4 was 38%. On the other hand, the DMB content for Example 5 was 43%.

At day 16, the temperature of the reactor was increased to 105° F. in both instances. Both catalysts responded with increased conversion at this higher temperature.

These two examples further show that a catalyst can be prepared from a dry-mix by simply starting-up the unit, however, about 1–2 days are required to complete catalyst formation. The process continues processing feed better with an on-stream formed catalyst than with a catalyst performed, even within the reactor, using a cyclohexane as the aluminum trichloride carrier liquid.

The above tests and examples show that the dry-mix method of preparing an aluminum halide on an adsorbent material support is very much faster than the conventional adsorption from solution procedure. Also, these examples show that a real advantage in activity and activity maintenance is obtained by the use of the dry-mix in the reactor at the start of a process run over the use of a circulating liquid through the reactor prior to start-up on the process feed.

*Example 6*

Experimental studies have shown that gamma alumina having a loss on ignition at 1832° F. of 2 weight percent has a surface hydroxyl coverage of about 35 percent and the same alumina with an LOI of 3 percent by weight has about 50 percent of the potential surface hydroxyl coverage (these coverages are not necessarily the same as the coverage on effective surface area as herein defined). The effect of the extent of surface-hydroxyl coverage, as determined by LOI, on the amount of the —O—AlCl$_2$ reaction product formed upon reaction of surface-hydroxyl-containing adsorbent solids with aluminum chloride is shown in Table I. The "gas phase" reaction was carried out by treating a dry physical mixture of aluminum chloride and the adsorbent solid for one hour with a flowing stream of inert gas at 300° F. and 0–450 p.s.i.g. Experiments have shown that effective reaction is obtained at hydrogen pressures ranging from atmospheric to 450 p.s.i.g. or higher, thus pressure is immaterial so long as sublimation of aluminum chloride from the surface-hydroxyl-containing adsorbent solid bed is not excessive. The "liquid phase" reaction was conducted by immersing solid aluminum chloride and the adsorbent solid in liquid cyclohexane at 75° F. for about 100 hours (other experiments have shown that a time of about 100 hours is required to complete the reaction of aluminum chloride with surface hydroxyl groups in liquid phase at 75–100° F.).

TABLE I

| Adsorbent solid | Reaction medium | LOI, weight percent | Aluminum Chloride species formed, mol. percent | |
|---|---|---|---|---|
| | | | —O—AlCl$_2$ | AlCl$_3$ monomer |
| Eta alumina | Liquid phase | 0.31 | 70 | 30 |
| Do | Gas phase [1] | 0.72 | 72 | 28 |
| Do | Liquid phase | 6.71 | 100 | 0 |
| Do | Gas phase [1] | 6.71 | 100 | 0 |
| Bauxite | do.[1] | 3.50 | 100 | 0 |
| Silica gel | do.[1] | 3.09 | 100 | 0 |
| Eta alumina | do.[2] | 1.85 | 74 | 26 |

[1] Hydrogen used as the inert gas.
[2] Helium was used in this test instead of hydrogen.

*Example 7*

Experiments were made to determine the quantity of HCl which can be associated with aluminum chloride alone, the reaction product of aluminum chloride with surface hydroxyl groups of surface-hydroxyl-containing adsorbent alumina (—O—AlCl$_2$ species), and an adsorbent alumina having positioned thereon both the —O—AlCl$_2$ species and AlCl$_3$ monomer species (72 percent —O—AlCl$_2$ species and 28 percent AlCl$_3$ species). These materials were placed in stainless steel bombs and treated with HCl gas at 85° F. and 80 p.s.i.g. for a time of 72 hours. The results of these experiments are shown in Table II.

TABLE II

| | Material treated | | |
|---|---|---|---|
| | AlCl$_3$ only | Alumina having 100% —O—AlCl$_2$ | Alumina having 72% —O—AlCl$_2$; 28% AlCl$_3$ |
| Wt. of material, gms | 111.5 | 120.6 | 72.9 |
| Wt. after treatment | 111.5 | 131.4 | 75.8 |
| HCl associated, gms | 0.0 | 10.8 | 2.8 |
| Mol ratio HCl/Al | 0.0 | 1.0 | 1.0 |

These data show that both the —O—AlCl$_2$ species and the AlCl$_3$ chemisorbed monomer species will associate HCl in a mol for mol ratio and that aluminum chloride itself will not associate HCl.

*Example 8*

The remarkable stability of the —O—AlCl$_2$ species positioned on eta alumina compared to the relative instability of the AlCl$_3$ monomer species also positioned on eta alumina is shown by the following comparative experiments. Aluminum chloride was reacted with two samples of eta alumina having weight loss on ignition at 1832° F. (LOI) below and within the desired range of 1 to 10 weight percent. Aluminum chloride was mixed with the eta alumina and reacted with the available surface hydroxyl groups of the alumina at 300° F. in a flowing stream of hydrogen. In the case of the low LOI alumina sufficient surface hydroxyl groups were not available for reaction, therefore about one third of the aluminum chloride is positioned on this adsorbent in the AlCl$_3$ monomer form. The loss of aluminum chloride from the solid products into a flowing stream of hydrogen at 700° F. and atmospheric pressure was then determined. The results of two comparative experiments are shown in Table III as follows:

TABLE III

| Test No. | 1 | 2 |
| --- | --- | --- |
| Reaction mixture composition, gms.: | | |
| Aluminum chloride | 43.2 | 52.5 |
| Eta alumina | 201.7 | 122.5 |
| Eta alumina LOI, wt. percent | 0.68 | 6.56 |
| Loss during reaction, H₂ flow at 300° F., gms.: | | |
| Aluminum chloride | 1.9 | 0.27 |
| HCl | 6.9 | 15.7 |
| Species of aluminum chloride positioned on the alumina, mol percent: | | |
| —O—AlCl₂ | 61.6 | 100.0 |
| AlCl₃ | 38.4 | 0.0 |
| Aluminum chloride loss during atm. pressure H₂ purge at 700° F., gms. | 13.1 | Nil |
| AlCl₃ monomer positioned on alumina: | | |
| After purge, millimoles | 13 | Nil |
| Before purge, millimoles | 119 | Nil |
| —O—AlCl₂ species positioned on alumina: | | |
| Before purge, millimoles | 191 | 392 |
| After purge, millimoles | 191 | 392 |
| Species lost from alumina during 700° F. purge, millimoles: | | |
| AlCl₃ monomer | 106 | Nil |
| —O—AlCl₂ | Nil | Nil |

*Example 9*

The results of experiments showing that all adsorbent solids are not equivalent nor are all alumina materials equivalent for use in making our catalyst and that aluminum chloride alone is relatively inactive are listed in the following Table IV. An eta-alumina alone and HCl treated eta-alumina containing 5.12 wt. percent chloride alone are also shown to be inactive. In each case where solid and aluminum chloride both were used the "catalyst" was prepared by forming a dry-mix of solid aluminum chloride with the solid being tested and contacting this mixture with liquid, saturated hydrocarbon at 75–125° F. HCl was associated with the catalyst in each test except Test 14 which shows the necessity for HCl association in order to produce a catalyst having significant activity. The catalyst was tested for activity in catalyzing the isomerization of hexanes to produce 2,2-dimethylbutane (2,2-DMB) commonly called neohexane. Neohexane is a valuable gasoline blending component having good volatility characteristics, a clear research octane number of 91.8 and a clear motor octane number of 93.4. The isomerization was carried out at a temperature of 122° F. in small stirred batch reactors a reaction time of 3 to 4 hours, except Test 14 which was tested in a flow run at 0.2 weight hourly space velocity (WHSV) and 75° F. Other tests have shown that results obtained in tests of this type give conversions comparable to the batch tests. The products were analyzed by gas chromatography. Other experiments have shown that near maximum conversion is obtained in these batch tests in 3 hours under the conditions used. The 2,2-DMB conversion reported is the concentration of neohexane in the hexane fraction of the product, excluding cyclohexane which was used in the feed in a concentration of about 10 weight percent to inhibit cracking of hexanes to lighter products. The cyclohexane did not undergo appreciable reaction during the tests. In each case, except in the charcoal test where 2-methylpentane was used, the feed material was a saturated hexane fraction of catalytic reformate. In Tests 1 and 2, aluminum trihydrate was the alumina-containing starting material which was then calcined to the indicated LOI, thus the solid actually used in preparing the catalyst was gamma alumina.

TABLE IV

| Test No. | Solid tested | LOI, wt. percent | Aluminum chloride, wt. percent of total solids | 2,2-DMB Conversion, wt. percent |
| --- | --- | --- | --- | --- |
| 1 | Alumina trihydrate | 8.9 | 50 | 47.6 |
| 2 | Alumina trihydrate | 4.7 | 50 | 47.8 |
| 3 | Eta alumina | 2.6 | 30 | 48.6 |
| 4 | Silica gel | 2.9 | 25 | 47.1 |
| 5 | Silica-alumina ¹ | 1.4 | 30 | 35.6 |
| 6 | Gamma alumina | 4.0 | 25 | 39.6 |
| 7 | Alpha alumina | Nil | 50 | 1.5 |
| 8 | Adsorbent charcoal | | 50 | 13.5 |
| 9 | Aluminum chloride | | 100 | 8.0 |
| 10 | Bauxite | 3.5 | 20 | 36.5 |
| 11 | Chi alumina | ² 3 | 20 | 43.9 |
| 12 | Eta alumina alone | 6.0 | 0 | 0 |
| 13 | HCl treated eta alumina containing 5.12 wt. percent Cl. | ³ 5.8 | 0 | 0 |
| 14 | Eta alumina | ² 1.2 | 25 | ⁴ 9.5 |

¹ 86% silica, 14% alumina.
² Estimated.
³ Before HCl treatment.
⁴ Catalyst material not associated with HCl, tested in flow run at 0.2 WHSV and 75° F.

*Example 10*

The advantage of conducting the HCl association as a separate step prior to placing the catalyst on oil rather than associating catalyst with HCl absorbed from the feed is shown by the following comparison hexane isomerization runs. The runs are made in a continuous flow pilot plant under the following conditions, employing the same type feed as described in Example 9: space velocity (Wo./hr./Wc.) of 0.15, reactor pressure of 200 p.s.i.g., reactor temperature of 100–110° F. and 5–7 wt. percent HCl in the feed. The catalyst materials are prepared by forming a dry physical mixture of 75 wt. percent eta-phase alumina and 25 wt. percent aluminum chloride in the reactor and heating the mixture to 300° F. with a flowing stream of hot hydrogen under a pressure of 300 p.s.i.g. then stopping the flow and allowing the mixture to stand in the presence of hydrogen for a few hours (about 24 hours). The catalyst materials are then cooled by a flowing stream of cool hydrogen.

One such catalyst material was then treated under pressure with gaseous HCl for 60 hours at 80° F. to effect HCl association and complete the formation of the catalyst. This catalyst was then placed on stream. The catalyst activity was checked after the first 12 hours of operation and the catalyst was found to be producing 54% neohexane in the hexane product. After 100 hours of operation this catalyst was still quite active, producing 51% neohexane in the product hexanes.

For comparison, another such catalyst material was not associated with HCl before being placed on oil, but was put immediately on stream and the HCl associated effected by the HCl in the feed process stream. After the first 12 hours on stream this catalyst was producing only 41% neohexane in the product hexanes. The activity of this catalyst continued to increase as the HCl association was gradually effected and finally reached a peak activity after being on stream 100 hours, producing 51% neohexane in the product hexanes at that time.

Thus the two catalysts reached equal activity after each had been on stream 100 hours, but the initial period of high neohexane production achieved with the separately associated catalyst was lost with the catalyst which was associated with HCl on stream.

While certain embodiments of the invention have been described for illustrative purposes, the invention obviously is not limited thereto. Various other modifications will be apparent to those skilled in the art in view of the above disclosure. Such modifications are within the spirit and scope of our invention.

Thus, having described the invention, what is claimed is:

1. A particulate solid hydrocarbon conversion catalyst prepared by contacting aluminum halide and a surfacehydroxyl-containing adsorbent solid and reacting said aluminum halide with surface hydroxyl groups of said adsorbent solid at a temperature in the range of about 0 to 500° F. and associating the solid product of said reaction with hydrogen halide at a pressure in the range of about 10 to 500 p.s.i.a. and a temperature in the range of about 60 to 200° F.

2. The catalyst of claim 1 wherein the halide of said hydrogen halide corresponds to the halide of said aluminum halide.

3. A solid, particulate hydrocarbon conversion catalyst prepared by reacting aluminum chloride with surface hydroxyl groups of a surface-hydroxyl-containing adsorbent solid and associating the solid product of said reaction with hydrogen chloride.

4. The catalyst of claim 3 wherein said adsorbent solid is selected from the class consisting of silica gel, chi alumina, eta alumina, gamma alumina and mixtures thereof.

5. A particulate solid hydrocarbon conversion catalyst prepared by treating a material having a constituent of the group consisting of silica, alumina and mixtures thereof to obtain a surface-hydroxyl-containing adsorbent solid having an effective surface area in the range of about 25 to 700 square meters per gram and at least about 50 percent of the effective surface in the hydroxyl form, reacting aluminum chloride with hydroxyl groups of said surface-hydroxyl-containing adsorbent solid at a temperature in the range of about 0 to 500° F., and associating HCl with the resultant solid product at a pressure in the range of about 10 to 500 p.s.i.a. and a temperature in the range of about 60 to 200° F.

6. The catalyst of claim 5 wherein said material is alumina trihydrate.

7. The catalyst of claim 5 wherein said material is bauxite.

8. The catalyst of claim 5 wherein said surface-hydroxyl-containing adsorbent solid is a member of the class consisting of silica gel, chi alumina, eta alumina, gamma alumina and mixtures thereof.

9. A process for preparing a hydrocarbon conversion catalyst which process comprises reacting aluminum halide with surface hydroxyl groups of a surface-hydroxyl-containing adsorbent solid at a temperature in the range of about 0 to 500° F. and associating hydrogen halide with the resultant solid product at a pressure in the range of about 10 to 500 p.s.i.a. and a temperature in the range of about 60 to 200° F.

10. A process for preparing a hydrocarbon conversion catalyst which process comprises reacting aluminum chloride with surface hydroxyl groups of a surface-hydroxyl-containing adsorbent solid at a temperature in the range of about 0 to 500° F. and associating hydrogen chloride with the resultant solid product at a pressure in the range of about 10 to 500 p.s.i.a. and a temperature in the range of about 60 to 200° F.

11. The process of claim 9 wherein said adsorbent solid is selected from the class consisting of silica gel, chi alumina, eta alumina, gamma alumina and mixtures thereof.

12. The process of claim 9 wherein said surface-hydroxyl-containing adsorbent solid is bauxite.

13. The process of claim 9 wherein said surface-hydroxyl-containing adsorbent solid comprises a form of synthetic alumina selected from the class consisting of chi, eta, and gamma forms and mixtures thereof, and containing molecular water content below about 1 percent by weight, and having a loss on ignition in the range of about 2 to 10 percent, which loss is due primarily to the liberation of water.

14. A process for preparing a hydrocarbon conversion catalyst, which process comprises calcining a material selected from the class consisting of silica-containing material, alumina-containing material, and mixtures thereof, at a temperature below about 1100° F. to produce an adsorbent solid having an effective surface area in the range of about 25 to 700 sq. m./gm. and a loss on ignition below about 4 percent, adding water to said adsorbent solid in the amount of at least about 1–6 percent by weight based on said adsorbent solid to produce a hydrated adsorbent solid having surface hydroxyl groups, drying said hydrated adsorbent solid to remove any adsorbed molecular water and produce a surface-hydroxyl-containing adsorbent solid containing less than about 1 percent adsorbed molecular water, reacting aluminum chloride with said surface-hydroxyl-containing adsorbent solid at a temperature in the range of about 0 to 500° F., and associating hydrogen chloride with the solid reaction product of said aluminum chloride with said surface-hydroxyl-containing adsorbent solid at a pressure in the range of about 10 to 500 p.s.i.a. and a temperature in the range of about 60 to 200° F. to produce said catalyst.

15. A process for preparing a hydrocarbon conversion catalyst, which process comprises treating with anhydrous hydrogen chloride an adsorbent solid selected from the class consisting of chi alumina, eta alumina, gamma alumina, silica gel and mixtures thereof and having a loss on ignition below about 4 percent, to produce a surface-hydroxyl-containing adsorbent solid, reacting aluminum chloride with surface hydroxyl groups of said surface-hydroxyl-containing adsorbent solid at a temperature in the range of 0 to 500° F., and associating hydrogen chloride with the solid product of said reaction at a pressure in the range of about 10 to 500 p.s.i.a. and a temperature in the range of about 60 to 200° F.

References Cited by the Examiner

UNITED STATES PATENTS

| | | | |
|---|---|---|---|
| 2,313,054 | 3/1943 | De Simo et al. | 260—683.75 |
| 2,450,764 | 10/1948 | Meyers | 260—683.75 |
| 2,999,074 | 9/1961 | Block et al. | 252—442 |
| 3,060,249 | 10/1962 | Wise | 260—683.75 |

DELBERT E. GANTZ, *Primary Examiner.*

ALPHONSO D. SULLIVAN, *Examiner.*